(12) United States Patent
Gruber et al.

(10) Patent No.: US 9,212,711 B2
(45) Date of Patent: Dec. 15, 2015

(54) BRAKE CALIPER OF A DISK BRAKE FOR A UTILITY VEHICLE

(71) Applicant: KNORR-BREMSE Systeme Fuer Nutzfahrzeuge GmbH, Munich (DE)

(72) Inventors: Markus Gruber, Ebersberg (DE); Wolfgang Pritz, Munich (DE); Martin Mack, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/222,262

(22) Filed: Mar. 21, 2014

(65) Prior Publication Data

US 2014/0202811 A1   Jul. 24, 2014

Related U.S. Application Data

(63) Continuation of application No. PCT/EP2012/068542, filed on Sep. 20, 2012.

(30) Foreign Application Priority Data

Sep. 22, 2011   (DE) .................... 10 2011 114 107

(51) Int. Cl.
*F16D 65/00* (2006.01)
*F16D 55/2255* (2006.01)
(Continued)

(52) U.S. Cl.
CPC ........ *F16D 65/0043* (2013.01); *F16D 55/2255* (2013.01); *F16D 65/0075* (2013.01); *F16D 2055/002* (2013.01); *F16D 2121/14* (2013.01); *F16D 2250/0084* (2013.01)

(58) Field of Classification Search
CPC ................... F16D 2055/0037; F16D 65/0043; F16D 65/0075; F16D 65/0081
See application file for complete search history.

(56) References Cited

U.S. PATENT DOCUMENTS

| 3,326,329 A   | 6/1967  | Harrison |
|---|---|---|
| 4,921,076 A * | 5/1990  | Grenier et al. ............... 188/72.6 |
| 7,815,022 B2  | 10/2010 | Aydt et al. |

(Continued)

FOREIGN PATENT DOCUMENTS

| DE | 10 2004 013 310 A1 | 9/2005 |
|---|---|---|
| DE | 10 2005 059 071 A1 | 6/2007 |

(Continued)

OTHER PUBLICATIONS

International Search Report with English translation (PCT/ISA/210) dated Dec. 12, 2012 (Four (4) pages).

(Continued)

*Primary Examiner* — Vishal Sahni
(74) *Attorney, Agent, or Firm* — Crowell & Moring LLP

(57) ABSTRACT

A brake caliper of a disk brake for a utility vehicle is provided. The brake caliper includes tension braces which are arranged substantially parallel and at a distance from each other, straddling a brake disk and connecting receptacles for functional parts arranged on both sides of the brake disk. One receptacle forms a caliper back and the other receptacle forms a housing having a lever dome formed thereon. The brake caliper includes at least one replaceable service-related wear protection element fastened to areas of potential wear during in-service use of the brake caliper, such as at the lower side of the leading tension brace and at least partially around the lever dome.

8 Claims, 2 Drawing Sheets

(51) Int. Cl.
 *F16D 55/00* (2006.01)
 *F16D 121/14* (2012.01)

(56) References Cited

U.S. PATENT DOCUMENTS

| | | | |
|---|---|---|---|
| 8,276,718 | B2 | 10/2012 | Bach et al. |
| 8,403,114 | B2* | 3/2013 | Falter et al. ................. 188/71.9 |
| 2004/0238296 | A1* | 12/2004 | Gotti et al. ................... 188/73.1 |
| 2007/0001511 | A1* | 1/2007 | Baumgartner et al. ....... 303/168 |
| 2007/0084681 | A1 | 4/2007 | Roberts |
| 2009/0152056 | A1* | 6/2009 | Heinz et al. ................. 188/72.5 |
| 2010/0163350 | A1* | 7/2010 | Bach et al. ................. 188/73.43 |
| 2011/0186391 | A1* | 8/2011 | Gruber et al. ............. 188/73.31 |

FOREIGN PATENT DOCUMENTS

| | | |
|---|---|---|
| DE | 10 2006 033 159 A1 | 1/2008 |
| DE | 10 2007 035 841 A1 | 2/2008 |
| DE | 10 2007 033 165 A1 | 5/2008 |
| DE | 60 2006 000 691 T2 | 3/2009 |
| DE | 2009 023 104 A1 | 12/2009 |
| DE | 20 2010 003 732 U1 | 8/2010 |
| EP | 1 577 578 B1 | 5/2007 |

OTHER PUBLICATIONS

German Office Action dated May 29, 2012 (Six (6) pages).

International Preliminary Report on Patentability (PCT/IB/326) and (PCT/IB/373) dated Apr. 3, 2014, including Written Opinion (PCT/ISA/237) (seven (7) pages).

* cited by examiner

BRAKE CALIPER OF A DISK BRAKE FOR A UTILITY VEHICLE

CROSS REFERENCE TO RELATED APPLICATIONS

This application is a continuation of PCT International Application No. PCT/EP2012/067169, filed Sep. 4, 2012, which claims priority under 35 U.S.C. §119 from German Patent Application No. 10 2011 114 107.7, filed Sep. 22, 2011, the entire disclosures of which are herein expressly incorporated by reference.

BACKGROUND AND SUMMARY OF THE INVENTION

The invention relates to a brake caliper of a disk brake for a utility vehicle.

The brake caliper, as part of a disk brake, serves essentially to receive functional parts required for the operation of the disk brake. These include, for example, an application device, which is arranged in a receiving chamber of the brake caliper, and brake pads, which are positioned on both sides of a brake disk and which are pressed against the brake disk during braking.

The two brake caliper halves which receive the functional parts, one of which forms a housing and other forms a caliper back, are connected to one another by tension braces, which furthermore absorb mechanical loads that occur during braking.

The application device mentioned includes a brake lever, which is covered over in relation to the external environment by a lever dome formed on the housing.

In addition to receiving the functional parts, the brake caliper also serves to protect them from the effects of weather and from dirt, especially since the brake disk is installed in an unprotected region of a vehicle rim, which is heavily exposed to dirt.

However, the brake caliper itself is subject to abrasive wear, particularly in certain areas, owing to its exposed position, leading ultimately to a reduction in the service life of the disk brake overall, especially since the brake caliper is designed as a casting and therefore the worn areas cannot be replaced.

Of course, this drawback is not acceptable, particularly from an economic point of view, especially since cast-iron brake calipers are designed for a significantly longer life than they actually achieve in practice due to the loading mentioned.

Moreover, said abrasive wear on the brake caliper can lead to a creeping reduction in the operational reliability of the disk brake since the tension braces, for example, are exposed to a considerable tensile loading, for which they are appropriately dimensioned.

In the case of wear-induced weakening of the tension braces, therefore, fracture may occur, making the entire disk brake incapable of functioning, with the resulting consequences, which do not need to be detailed.

It is the underlying object of the invention to develop a brake caliper of the type in question in such a way that its service life is optimized and the operational reliability of the disk brake overall is improved.

With very low outlay in terms of design and manufacture, the invention provides a brake caliper, the service life of which is no longer determined by factors extraneous to the system.

Although there is abrasive wear on the brake caliper, as before, it is only on the protective elements fitted, the positioning of which is known from practical experience.

Thus, in practice, it has been found that the areas of service-related wear, namely of abrasive wear, are found particularly on the tension brace which is on the leading edge, in relation to the rotating brake disk, and on the lever dome.

Corresponding protective elements are now provided here, and these are preferably designed as formed sheet metal parts and can be produced in a particularly simple manner by punching.

As a result, these protective elements can be provided at extraordinarily low cost, all that is required for fastening them being fastening means. Particularly suitable for this purpose are screws, which are screwed into prepared threaded holes in the tension brace and the lever dome.

In the case of a pneumatically actuated disk brake, a flange, on which a brake cylinder can be secured, is formed on the rear of the lever dome. This flange can also be used to fix the protective element, using the screws by which the brake cylinder is connected to the flange.

According to another concept of the invention, it is envisaged that protective elements on the tension brace should be designed in the manner of a plate-shaped stirrup with laterally formed fastening lugs, wherein this tension brace protector projects laterally outward over virtually the entire length of the tension brace.

The protective element for the lever dome, referred to as a lever dome protector, is preferably of horseshoe configuration and forms a stripper, e.g. for ice adhering to the rim, which would otherwise be stripped off by the lever dome, as is the case in the prior art.

In order to obtain protective elements with as long a life as possible, these are composed of a wear-resistant material, in particular an appropriate metal, wherein, as mentioned, these protective elements can be replaced when required at any time without major effort, thus ensuring that the brake caliper achieves the desired service life without problems, or at least without service-related external influences on the potential areas of wear.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
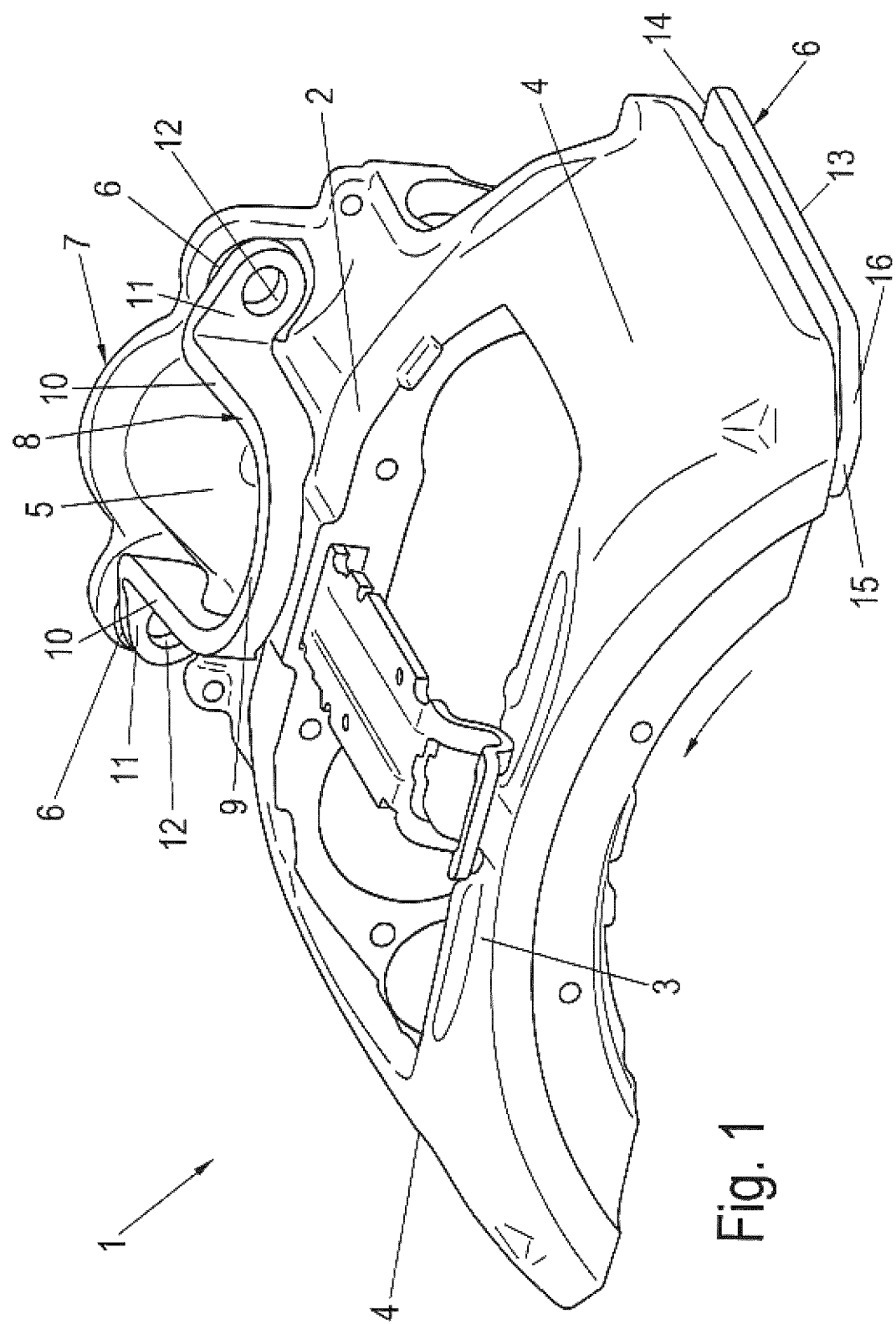
FIG. 1 shows a brake caliper according to an embodiment of the invention in a perspective plan view

In the figures, a caliper 1 of a disk brake for a utility vehicle is shown, said caliper being composed substantially of cast iron and having two tension braces 4, which are arranged parallel and at a distance from one another, that bridge a brake disk transversely to the direction of rotation thereof in the assembled position. The tension braces 4 connect receptacles for functional parts arranged on both sides of the brake disk to one another, wherein one receptacle forms a caliper back 3 and the other receptacle forms a housing 2 having a lever dome 5 formed thereon.

According to this embodiment of the invention, a replaceable protective element is fastened at each potential area of service-related wear.

In the example shown, one protective element is secured as a tension brace protector 6 on the underside of the tension brace 4 situated at the leading edge in relation to the direction of rotation of the brake disk (not shown) in normal operation, wherein the direction of rotation is indicated by an arrow in FIG. 1.

Figure 2:
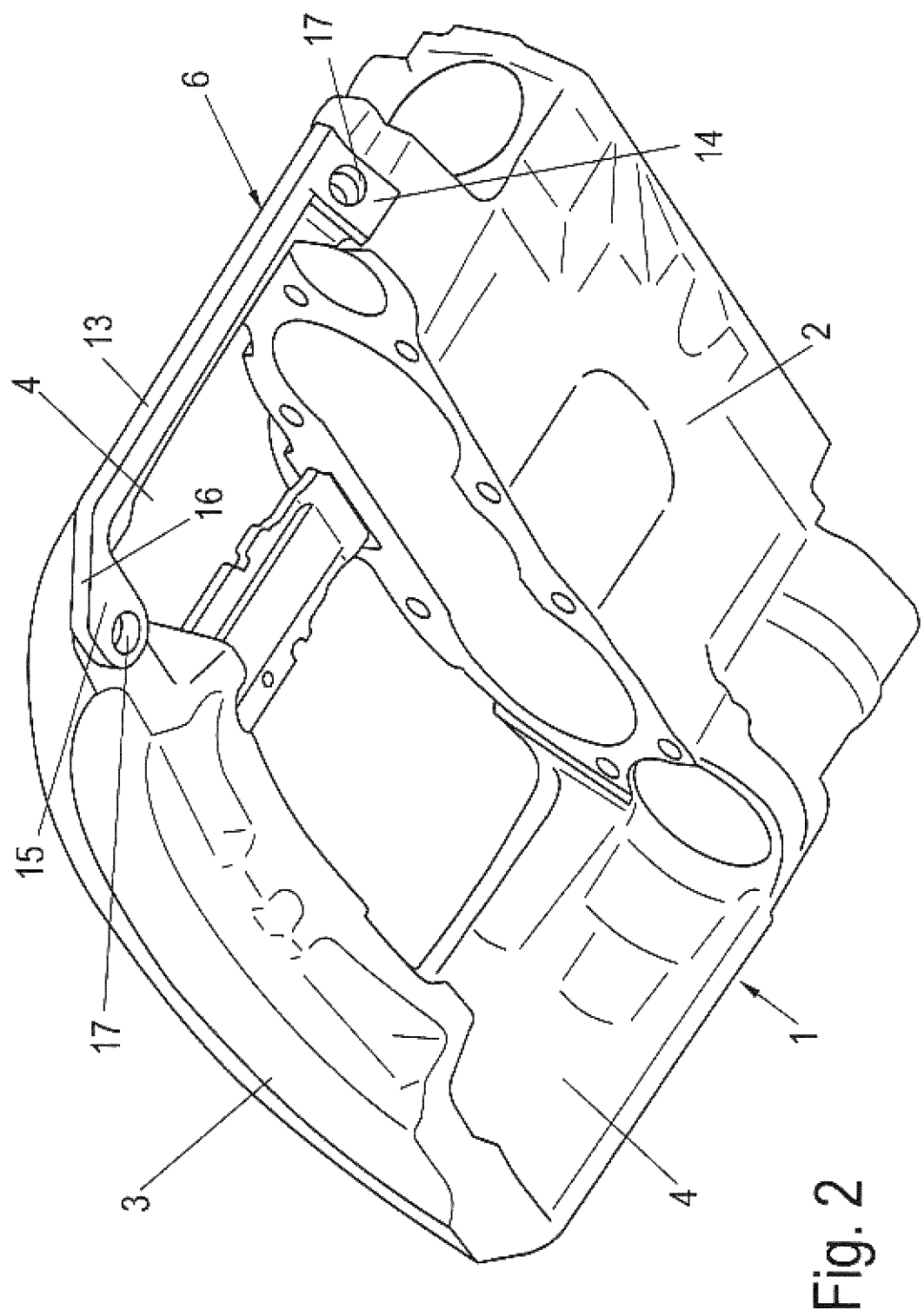
FIG. 2 shows a perspective bottom view of the brake caliper of FIG. 1.

As FIG. 2, in particular, very clearly shows, the tension brace protector 6 is of stirrup-shaped design, having a bar 13 and angled connection lugs 14, 15 at the ends, which each have a hole 17 for the passage of a screw, preferably a cap screw, which can be screwed into a nut thread (not shown) of the tension brace 4, allowing the tension brace protector 6 to be replaced without problems.

In the transition zone to the bar 13, the connection lug 15 of the tension brace protector 6 which is remote from the housing 2 has a bevel 16 to match the contour of the tension brace 4 in this region.

FIG. 1 shows very clearly that the bar 13 projects outward beyond the tension brace 4, providing effective protection for the tension brace 4 from dirt thrown up by a rim.

The lever dome 5, likewise recognized as a potential area of service-related wear, is likewise protected by a protective element, formed by a lever dome protector 8. This is of horseshoe configuration and, on the one hand, is supported on the housing region adjacent to the lever dome 5 and, on the other hand, is secured on a flange 7, to which a brake cylinder is connected in operation.

The lever dome protector 8, with two legs 9 extending approximately parallel to one another and a convexly curved web 9 connecting them, has lugs 11 angled outward at the free ends of the legs 10, with through holes 12 for the passage of fastening screws.

The height of the lever dome protector 8 is dimensioned in such a way that it projects above the lever dome 5 at least slightly, and effective protection of the lever dome 5 is achieved as a result.

In principle, of course, there is the possibility also of attaching protective elements to regions of the brake caliper 1 other than those shown if practical experience shows that this is necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 brake caliper
2 housing
3 caliper back
4 tension brace
5 lever dome
6 tension brace protector
7 flange
8 lever dome protector
9 web
10 leg
11 lug
12 hole
13 bar
14 connection lug
15 connection lug
16 bevel
17 hole

What is claimed is:

1. A brake caliper of a disk brake for a utility vehicle, comprising:
   receptacles for functional parts arranged to be located on opposite sides of a brake disk when the brake caliper is mounted on the utility vehicle, wherein a first one of the receptacles is a caliper back and a second one of the receptacles is a housing having a lever dome;
   tension braces connecting the receptacles, the tension braces being arranged substantially parallel and at a distance from one another and bridging over an outer radius of the brake disk when the brake caliper is mounted on the utility vehicle; and
   at least one replaceable protective element located at at least one area of service-related wear on the brake caliper,
   wherein
      the at least one replaceable protective element includes a tension brace protector arranged on an underside of the tension brace facing away from the lever dome, and
      the at least one replaceable protective element includes a lever dome protector.

2. The brake caliper as claimed in claim 1, wherein the tension brace protector is secured on a one of the tension braces located at a leading edge of the brake caliper relative to a forward rotation direction of the brake disk.

3. The brake caliper as claimed in claim 2, wherein the tension brace protector projects outward from the brake caliper beyond the one of the tension braces.

4. The brake caliper as claimed in claim 3, wherein the tension brace protector is stirrup-shaped, having a bar and two angled lugs, the two angled lugs including holes for passage of fasteners.

5. The brake caliper as claimed in claim 1, wherein the lever dome protector is horseshoe-shaped, having two angled lugs with holes for passage of fasteners.

6. The brake caliper as claimed in claim 5, wherein the lever dome protector is connected to a flange of the lever dome.

7. The brake caliper as claimed in claim 1, wherein the lever dome protector rests on the housing and at least partially surrounds the lever dome.

8. The brake caliper as claimed in claim 1, wherein the lever dome protector has a height equal to or greater than the height of the lever dome.

* * * * *